United States Patent
Tsai et al.

(10) Patent No.: US 8,960,411 B2
(45) Date of Patent: Feb. 24, 2015

(54) DISPENSING DEVICE FOR VENDING MACHINE

(71) Applicants: Chi-Ming Tsai, Hemei Town (TW); I-Chiang Yang, Hemei Town (TW)

(72) Inventors: Chi-Ming Tsai, Hemei Town (TW); I-Chiang Yang, Hemei Town (TW)

(73) Assignee: Feiloli Electronic Co., Ltd, Hemei Town, Changhua County ( * ) Notice: Subject to any disclaimer, the term of this patent is extended or adjusted under 35 U.S.C. 154(b) by 150 days.

(21) Appl. No.: 13/786,244

(22) Filed: Mar. 5, 2013

(65) Prior Publication Data
US 2014/0251756 A1    Sep. 11, 2014

(51) Int. Cl.
*B65G 47/36*    (2006.01)
*A63F 9/30*    (2006.01)

(52) U.S. Cl.
CPC .. *B65G 47/36* (2013.01); *A63F 9/30* (2013.01)
USPC ..................................... 198/465.4; 198/485.1

(58) Field of Classification Search
CPC ....................................................... B65G 47/36
USPC .................. 198/465.4, 485.1, 486.1; 273/447
See application file for complete search history.

(56) References Cited

U.S. PATENT DOCUMENTS

| | | | | |
|---|---|---|---|---|
| 3,184,042 A | * | 5/1965 | Rutkovsky et al. | 198/367 |
| 3,451,148 A | * | 6/1969 | Funk | 37/390 |
| 4,022,338 A | * | 5/1977 | Laursen | 414/564 |
| 4,598,812 A | * | 7/1986 | Grube et al. | 198/345.3 |
| 4,756,401 A | * | 7/1988 | Kempton | 198/468.6 |
| 5,141,094 A | * | 8/1992 | Speckhart et al. | 198/349 |
| 5,927,472 A | * | 7/1999 | Neef et al. | 198/465.4 |
| 6,199,682 B1 | * | 3/2001 | Matkovich | 198/465.4 |
| 6,523,462 B1 | * | 2/2003 | Johnson et al. | 99/443 C |
| 7,404,480 B2 | * | 7/2008 | Santicchi | 198/465.4 |
| 7,431,142 B2 | * | 10/2008 | Eberle | 198/465.4 |

* cited by examiner

*Primary Examiner* — Mark A Deuble

(57) ABSTRACT

A vending machine is equipped with a dispensing device that includes a plate, a track, carriers, a work station, a driving unit and a sensor. The plate is horizontally placed in a vending machine. The track is connected to the plate. The carriers are movably connected to the track for carrying products. The work station causes a selected one of the carriers to release the corresponding one of the products. The driving unit drives the carriers along the track. The sensor senses the selected one of the carriers and accordingly stops the driving unit so that the selected one of the carriers is placed at the work station.

16 Claims, 5 Drawing Sheets

DISPENSING DEVICE FOR VENDING MACHINE

BACKGROUND OF INVENTION

1. Field of Invention

The present invention relates to a vending machine and, more particularly, to a dispensing device for a vending machine 2. Related Prior Art A conventional vending machine includes a box, a moving member, a thread-cutting device and a control device. The moving member, the thread-cutting device and the control device are placed in the box. The moving member and the thread-cutting device are operable by the control device. The moving member includes a bridge movable in a first direction. The thread-cutting device, which includes a pair of scissors, is movable along the bridge in a second direction perpendicular to the first direction. Threads are used to tie products such as dolls and toys to a crossbar extending in the box in a third direction parallel to the first direction. When one of the products is selected, the bridge is moved to a position above the selected product. The pair of scissors is moved to the thread tied to the selected product before the pair of scissors is operated to cut the thread tied to the selected product member. Finally, the selected product falls and slides toward a buyer via a chute. The conventional vending machine is effective. However, to display the products in the conventional vending machine, the products must be tied with the threads, and this is a troublesome practice. Moreover, the segment of the thread tied to the selected product is useless, i.e., it cannot be used to hang the selected product on a hook or the like. Furthermore, the number of the products that are displayed is limited because they are arranged along the single crossbar.

Therefore, the present invention is intended to obviate or at least alleviate the problems encountered in prior art.

SUMMARY OF INVENTION

It is the primary objective of the present invention to provide a vending machine with a convenient dispensing device.

To achieve the foregoing objective, the dispensing device includes a plate, a track, carriers, a work station, a driving unit and a sensor. The plate is horizontally placed in a vending machine. The track is connected to the plate. The carriers are movably connected to the track for carrying products. The work station causes a selected one of the carriers to release the corresponding one of the products. The driving unit drives the carriers along the track. The sensor senses the selected one of the carriers and accordingly stops the driving unit so that the selected one of the carriers is placed at the work station.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
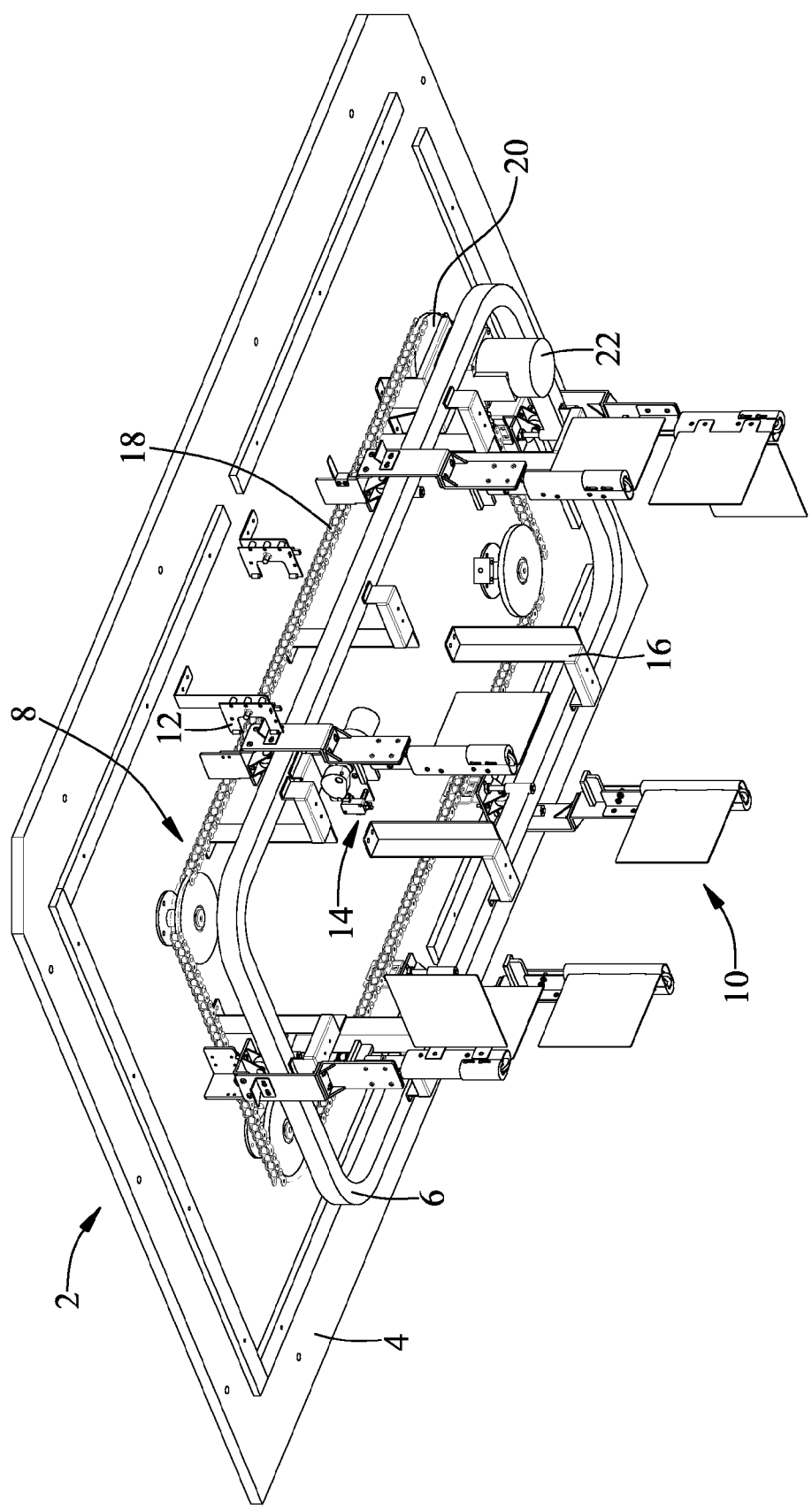
FIG. 1 is a perspective view of a dispensing device according to the preferred embodiment of the present invention.

Referring to FIG. 1, there is shown a dispensing device 2 for use in a vending machine according to the preferred embodiment of the present invention. The dispensing device 2 includes a plate 4, a track 6, a driving unit 8, six carriers 10, a sensor 12 and a work station 14.

The plate 4 is horizontally placed in an upper portion of a vending machine. The track 6 is connected to a lower face of the plate 4. The track 6 extends along a rectangular path in a horizontal plane so that the track 6 includes four corners. To this end, there are used four hangers 16 for example. Each of the hangers 16 includes a lower section transversely extending from an upper section. The upper section of each of the hangers 16 is connected to the lower face of the plate 4. The lower section of each of the hangers 16 is connected to a lower face of the track 6.

The driving unit 8 includes a chain 18, four sprocket wheels 20 and a motor 22. The sprocket wheels 20 are attached to the lower face of the plate 4, with each of the sprocket wheels 20 placed above and near a corresponding one of the corners of the track 6. The motor 22 is attached to the lower face of the plate 4 and operatively connected to one of the sprocket wheels 20. The sprocket wheel 20 that is operatively connected to the motor 22 is referred to as the "driver sprocket wheel 20", and the other sprocket wheels 20 are referred to as the "idle sprocket wheels 20." The chain 18 is engaged with the sprocket wheels 20 so that the chain 18 extends along a rectangular path in a horizontal plane above the horizontal plane in which the track 6 extends.

Figure 2:
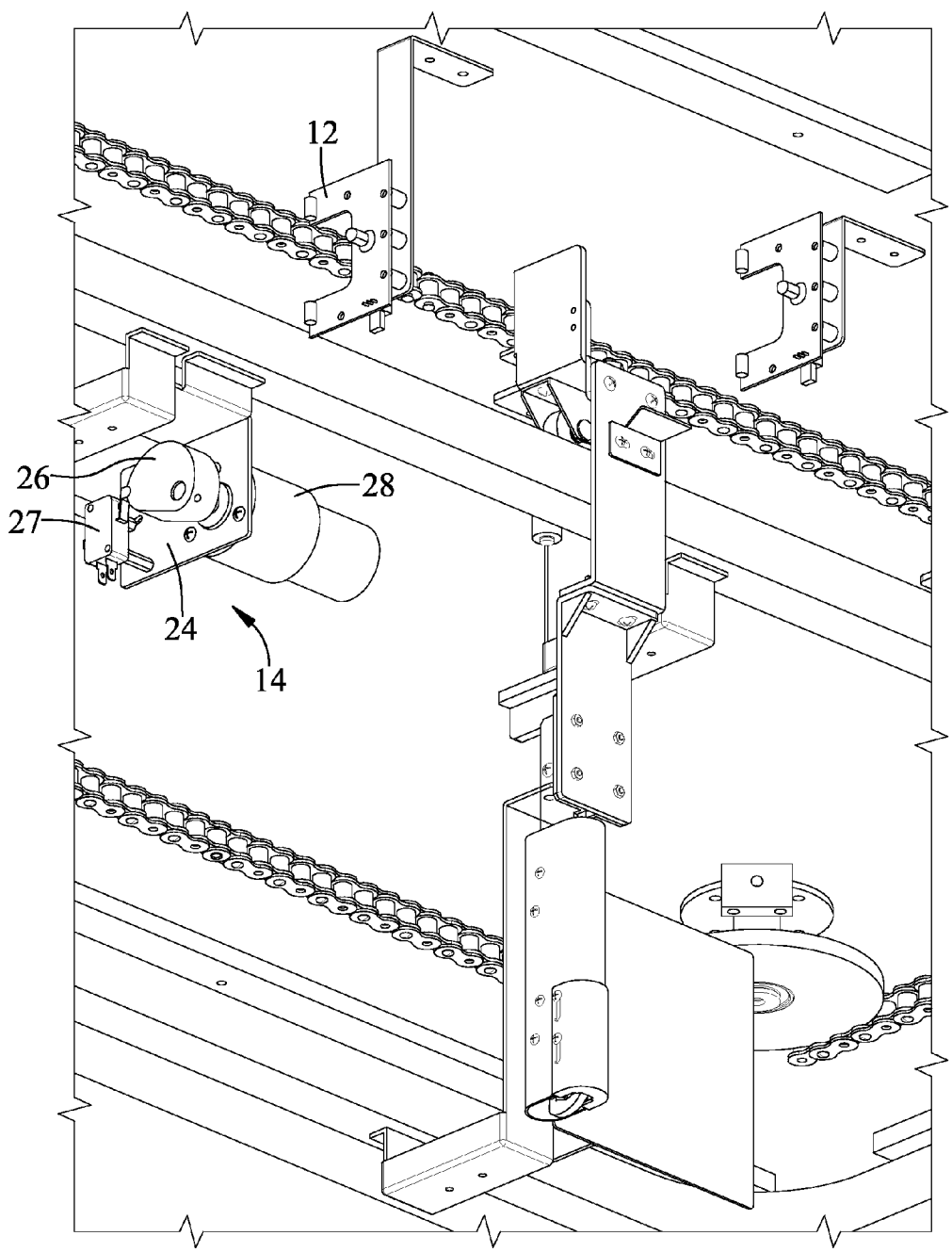
FIG. 2 is an enlarged partial view of the dispensing device in another position than shown in FIG. 1.

Referring to FIG. 2, the work station 14 includes a frame 24, a cam 26, a sensor 27 and a motor 28. The frame 24 includes an upper portion connected to the lower face of the track 6. The motor 28 is connected to a lower portion of the frame 24. The motor 28 is operatively connected to the cam 26 so that the motor 28 causes the cam 26 to rotate about a horizontal axis. The sensor 27 is attached to the lower portion of the frame 24. The sensor 27 may be a micro-switch electrically connected to the motor 28. The sensor 27 senses the rotation of the cam 26 and controls the motor 28 based on the rotation of the cam 26.

Figure 3:
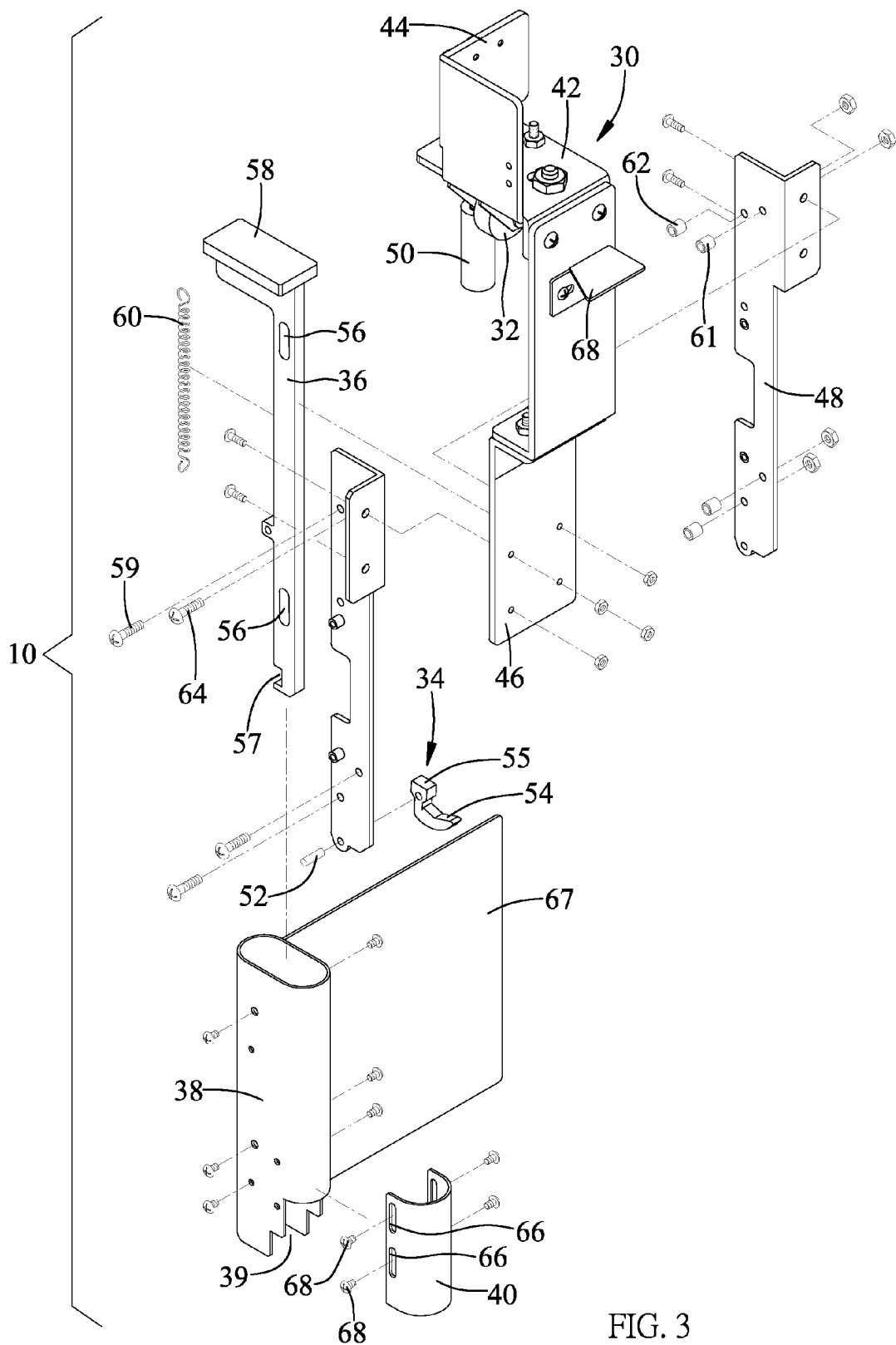
FIG. 3 is an exploded view of a carrier of the dispensing device shown in FIG. 2.

Referring to FIG. 3, each carrier 10 includes a frame 30, a castor 32, a hook 34, a rod 36, a sleeve 38 and a gate 40. The frame 30 includes a platform 42, a tab 44, a strip 46 and two fins 48. The tab 44 includes a first portion that extends upward from the platform 42 and a second portion that transversely extends from the first portion. The second portion of the tab 44 is connected to the chain 18. The strip 46 extends downward from the platform 42. The fins 48 are connected to the strip 46, with a gap defined between the fins 48.

The castor 32 is attached to a lower face of the platform 42 so that the castor 32 is rotatable about a horizontal axis. Two rollers 50 are connected to the lower face of the platform 42 so that each of the rollers 50 is rotatable about a vertical axis. The castor 32 is placed between the rollers 50.

The hook 34 includes a bent section 54 at an end and an enlarged section 55 at another end. The enlarged section 55 of the hook 34 is placed between and pivotally connected to lower sections of the fins 48 by a pin 52.

The rod 36 includes two slots 56 defined therein, a recess 57 defined near a lower end, and an anvil 58 formed at an upper end. The slots 56 are arranged along the longitudinal direction of the rod 36. The rod 36 is placed between and movably connected to the fins 48 by inserting two pins 59 in two apertures 60 defined in the fins 48 through the slots 56. To reduce friction, a bushing 61 is provided on each of the pins 59.

There is provided a spring 60 for biasing the rod 36 upward relative to the fins 48. The spring 60 is a helical spring that includes a lower end connected to the rod 36 and an upper end connected to a bushing 62 provided on a screw 64 inserted through and supported on the fins 48.

The sleeve 38 includes upper and lower open ends and a cutout 39 defined near the lower open end. The sleeve 38 is placed around and attached to the fins 48 by several screws (not numbered).

The gate 40 includes two flat lateral members extending from an arched front member. Each of the lateral members of the gate 40 includes two slots 66 defined along a same vertical line. The gate 40 is connected to the sleeve 38 by inserting screws 68 in the sleeve 38 through the slots 66 so that the gate 40 is movable between upper and lower positions on the sleeve 38. In the upper position, the gate 40 opens the cutout 39. In the lower position, the gate 40 shuts the cutout 39.

There is a number plate 67 attached to the sleeve 38. The number plate 67 is printed with a number, letter or any other proper symbol.

The sensor 12 is attached to the lower face of the plate 4. There is a trigger 68 attached to the first portion of the tab 44. The trigger 68 is made and placed corresponding to the sensor 12. For example, the sensor 12 is a photoelectric device while the trigger 68 is a corresponding shutter. The sensor 12 includes a transmitter and a receiver so that the receiver receives a ray from the transmitter. The sensor 12 sends a signal when the receiver fails to receive the ray from the transmitter as the ray is interrupted by the trigger 68.

Figure 4:
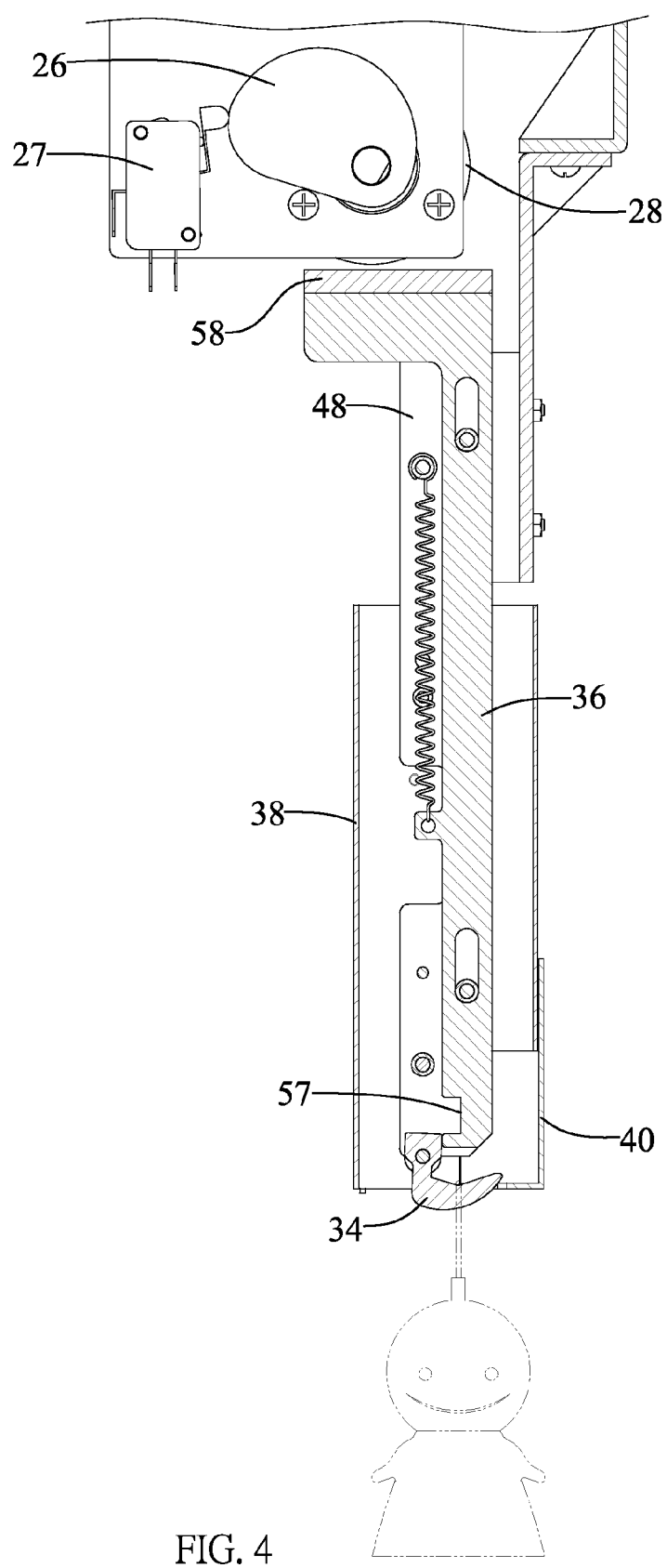
FIG. 4 is a cross-sectional view of the dispensing device shown in FIG. 1.

Referring to FIG. 4, a product such as a doll is hung on the bent portion of the hook 34. The enlarged portion of the hook 34 is placed against the lower end of the rod 36 to keep the hook 34 in position, i.e., avoid pivoting of the hook 34. The gate 40 is placed in a lower position relative to the sleeve 38, with a limited gap left between the bent portion of the hook 34 and the gate 40. Thus, it is ensured that the doll is hung on the bent portion of the hook 34.

The vending machine includes an interface device (not shown) in addition to the distributing device. The interface device includes a touch panel or keypad.

In operation, six dolls are carried by the six carriers 10. The dolls are represented by the number plates 67. A buyer chooses one of the dolls, reads the symbol on the corresponding number plate 67, and accordingly operates the interface device. The motor 22 causes the driver sprocket wheel 20 to rotate. The driver sprocket wheel 20 drives the chain 18. The chain 18 causes the carriers 10 to move along the track 6. The carriers 10 transport the dolls. The motor 22 is stopped when a signal is sent from the sensor 12 as the ray is interrupted by the trigger 68 of the carrier 10 corresponding to the selected doll.

Figure 5:
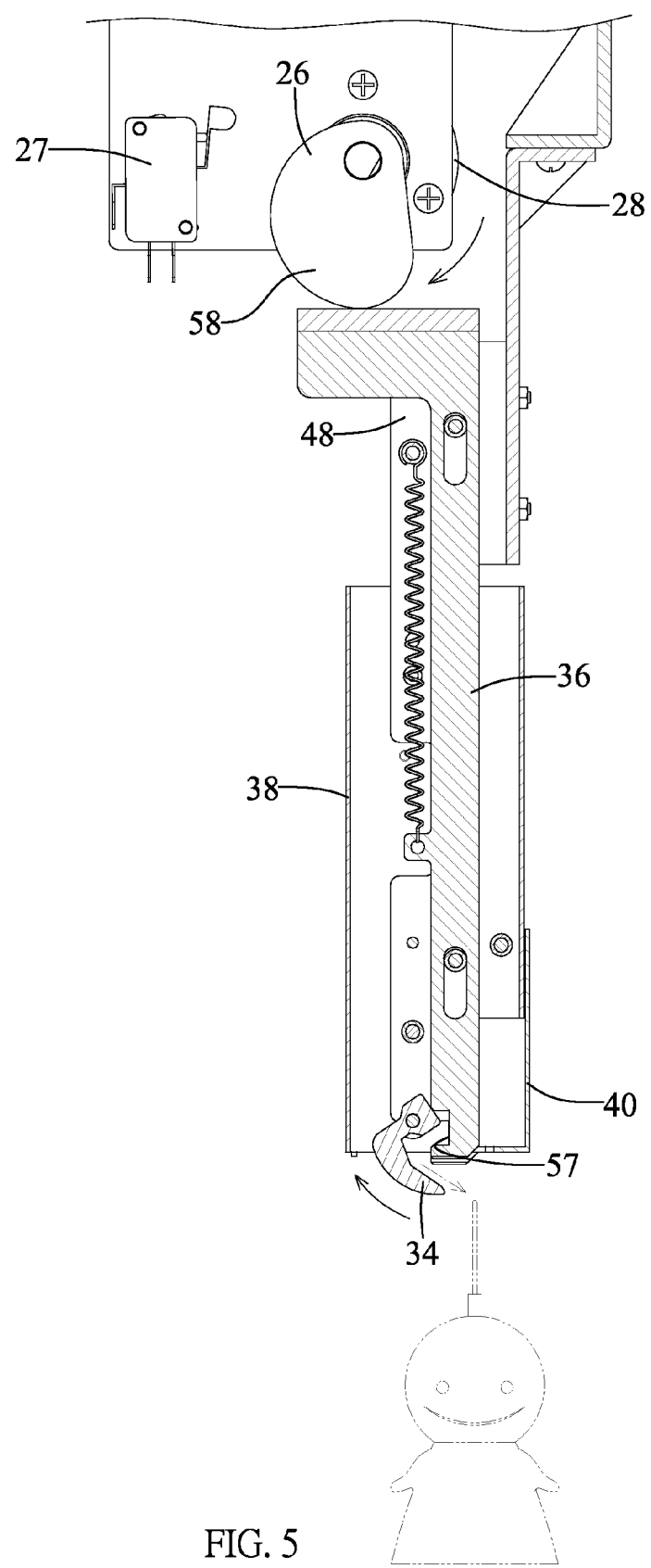
FIG. 5 is a cross-sectional view of the dispensing device in another position than shown in FIG. 4.

Then, the motor 28 is turned on to cause the cam to rotate from the position shown in FIG. 4 into the position shown in FIG. 5 so that the cam 26 presses against the anvil 58 and pushes down the rod 36. The enlarged portion of the hook 34 is admitted into the recess 57, i.e., the hook 34 is allowed to pivot. Thus, the selected doll is released from the bent portion of the hook 34 because of weight. Finally, the sensor 27 detects the lobe of the cam 26 and accordingly turns off the motor 28. The spring 60 returns the rod 36 upward.

The gate 40 can manually be moved into an upper position relative to the sleeve 38, with a large gap left between the bent portion of the hook 34 and the gate 40. Thus, another doll can manually be hung on the bent portion of the hook 34. Then, the gate 40 can manually be returned into the lower position relative to the sleeve 38.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A dispensing device including:
    a plate horizontally placed in a vending machine;
    a track connected to the plate;
    carriers movably connected to the track for carrying products, wherein each of the carriers includes:
        a castor for rolling on the track so that the carrier is movable along the track;
        two rollers for rolling against the track to keep the castor movable along the track;
        a frame for supporting the castor and the rollers; and
        a hook pivotally connected to the frame between a first position for firmly hooking the product and a second position for releasing the product due to weight;
    a work station for causing a selected one of the carriers to release the corresponding product;
    a driving unit for driving the carriers along the track; and
    a sensor for sensing the selected carrier and accordingly stopping the driving unit so that the selected carrier is placed at the work station.

2. The dispensing device according to claim 1, wherein the driving unit includes:
    sprocket wheels attached to the plate;
    a chain engaged with the sprocket wheels and connected to the carriers; and
    a motor attached to the plate and operatively connected to one of the sprocket wheels.

3. The dispensing device according to claim 1, wherein the rollers are rotatable about vertical axes while the castor is rotatable about a horizontal axis.

4. The dispensing device according to claim 1, wherein each of the carriers further includes a rod movably connected to the frame between a first position for keeping the hook in the first position and a second position for allowing the hook to pivot into the second position.

5. The dispensing device according to claim 4, wherein the rod includes a recess for receiving a portion of the hook in the second position.

6. The dispensing device according to claim 5, wherein the hook includes an enlarged section for abutment against the rod in the first position and insertion in the recess in the second position.

7. The dispensing device according to claim 4, wherein each of the carriers includes a spring for biasing the rod to the first position.

8. The dispensing device according to claim 7, wherein the frame includes:
    a platform for supporting the castor and the rollers;
    a tab including a first portion connected to the platform and a second portion connected to the chain; and
    a strip connected to the platform, wherein the hook and the rod are connected to the strip, wherein the spring is connected to the strip at an end and connected to the rod at another end.

9. The dispensing device according to claim 8, wherein each of the carriers further includes two fins connected to the strip, wherein the rod and the spring are placed between and movably connected to the fins.

10. The dispensing device according to claim 9, wherein the rod is placed between and pivotally connected to the fins.

11. The dispensing device according to claim 10, wherein each of the carriers further includes a sleeve for covering the hook, a portion of the rod and a portion of each of the fins.

12. The dispensing device according to claim 11, wherein the sleeve includes a cutout for allowing easy access to the hook.

13. The dispensing device according to claim 12, wherein each of the carriers further includes a gate movably connected to the sleeve between a first position for shutting the cutout and a second position for opening the cutout so that the product can easily be hung onto the hook via the cutout.

14. The dispensing device according to claim 4, wherein the work station further includes a cam for pushing the rod to the second position from the first position.

15. The dispensing device according to claim 14, wherein the workstation further includes a motor operatively connected to the cam.

16. The dispensing device according to claim 15, wherein the work station further includes a sensor electrically connected to the motor, wherein the sensor senses the rotation of the cam and sends a signal for turning off the motor when the cam rotates for a round.

\* \* \* \* \*